US010739768B2

(12) United States Patent
Liao-McPherson et al.

(10) Patent No.: US 10,739,768 B2
(45) Date of Patent: Aug. 11, 2020

(54) SMOOTHED AND REGULARIZED FISCHER-BURMEISTER SOLVER FOR EMBEDDED REAL-TIME CONSTRAINED OPTIMAL CONTROL PROBLEMS IN AUTONOMOUS SYSTEMS

(71) Applicant: TOYOTA MOTOR ENGINEERING & MANUFACTURING NORTH AMERICA, INC., Plano, TX (US)

(72) Inventors: Dominic M. Liao-McPherson, Ann Arbor, MI (US); Mike X. Huang, Ann Arbor, MI (US); Kevin M. Zaseck, New Hudson, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 76 days.

(21) Appl. No.: 16/058,831

(22) Filed: Aug. 8, 2018

(65) Prior Publication Data
US 2020/0050196 A1    Feb. 13, 2020

(51) Int. Cl.
*G05D 1/00*    (2006.01)
*G05B 13/04*   (2006.01)
*G06F 17/15*   (2006.01)

(52) U.S. Cl.
CPC ......... *G05D 1/0088* (2013.01); *G05B 13/042* (2013.01); *G05B 13/048* (2013.01); *G06F 17/15* (2013.01); *G05D 2201/0213* (2013.01)

(58) Field of Classification Search
None
See application file for complete search history.

(56) References Cited

U.S. PATENT DOCUMENTS 8,346,416 B2    1/2013   Liu et al.
2007/0079605 A1  4/2007   Hu et al.
(Continued)

OTHER PUBLICATIONS

Authors: Kichun Jo and Myoungho Sunwoo; Title: Generation of a Precise Roadway Map for Autonomous Cars; Date: Jun. 2014; Publisher: IEEE; Pertinent pp. 925-936 (Year: 2014).*

(Continued)

*Primary Examiner* — David P. Merlino
*Assistant Examiner* — Nicholas A Mahon
(74) *Attorney, Agent, or Firm* — Oblon, McClelland, Maier & Neustadt, L.L.P.

(57) ABSTRACT

A system including a controller configured to, in each sampling period, minimize a distance of the autonomous vehicle from a target path by solving a constrained control problem, input sensor values and estimators that are calculated based on the sensor values and dynamic models and record the sensor values and the estimators in a memory of the controller, incorporate the sensor values and the estimators into conditions for minimizing the distance of the autonomous vehicle from the target path associated with the constrained control problem, map the conditions for minimizing the distance of the autonomous vehicle from the target path to a non-smooth system using Fischer-Burmeister function, smooth the non-smooth system and apply Newton method iterations to the smoothed system in order to converge on a solution, and issue commands including a steering command that control actuators of the autonomous vehicle based on the solution.

17 Claims, 9 Drawing Sheets

(56) References Cited

U.S. PATENT DOCUMENTS

2014/0358355 A1    12/2014  Zimmerschied
2016/0025028 A1     1/2016  Vaughan
2018/0281191 A1*  10/2018  Sinyayskiy ......... A47L 11/4061

OTHER PUBLICATIONS

Authors: Jein-Shan Chen and Shaohau Pan; Title; A Regularization Semismooth Newton Method Based on the Generalized Fischer-Burmeister Function for P0-NCPs; Date Aug. 29, 2007; Publisher: Science Direct; Pertinent pp. 477 (Year: 2007).*

Author: Houyuan Jiang; Title: Smoothed Fischer-Burmeister Equation Methods for the Complementarity Problem; Date: Jan. 1997; Publisher: Research Gate; Pertinent pp. 13 (Year: 1997).*

* cited by examiner

SMOOTHED AND REGULARIZED FISCHER-BURMEISTER SOLVER FOR EMBEDDED REAL-TIME CONSTRAINED OPTIMAL CONTROL PROBLEMS IN AUTONOMOUS SYSTEMS

RELATED APPLICATIONS

This application is related to application Ser. No. 15/705,934 filed Sep. 15, 2017, and application Ser. No. 15/866,767 filed Jan. 10, 2018, the entire contents of which are incorporated herein by reference.

BACKGROUND

Field of Disclosure

The present disclosure relates generally to methods and controls for autonomous systems and, more particularly, to methods for controlling autonomous vehicles, including minimizing path tracking error subject to constraints related to actuator limits representing vehicle safety limits. The methods and controls apply a Regularized and Smoothed Fischer-Burmeister technique to model and minimize the distance of the vehicle from the target path in real time.

Description of the Related Art

Autonomous vehicles are being developed in which actuators of a vehicle are controlled by way of a controller with input from sensors. Presently, improvements in control of vehicle subsystems are being implemented. For example, typically one or multiple controllers may be embedded in the engine control unit (ECU) to control various automotive actuators in response to sensors detecting vehicle performance in order to optimize control of the vehicle engine. Sensors for detecting vehicle performance may include sensors that detect engine speed and vehicle velocity. Increasingly, other sensors such as cameras and various types of radar are being mounted in vehicles as part of driver-assist systems. Video cameras are being used to provide a view from the rear of the vehicle while the vehicle is being backed up. Radar antennas serve to provide indications of nearby objects. Additional types of sensor technologies are being developed for use with vehicles. An example additional sensor technology is a LIDAR, which illuminates a target with a laser light. A LIDAR can measure distance to an object and may be used for obstacle detection. LIDAR has been used as part of active driver-assist technologies, such as steering and acceleration compensation; for example, steering and acceleration compensation may be implemented for cases where a vehicle is following too closely to another vehicle, or when a vehicle is veering into another lane or close to the edge of a road.

Vehicle control may take many forms, ranging from simple rules to full-fledged optimization processes. Control by way of solving an optimization problem can be prohibitive in time and required computing power. In other words, solution of an optimization problem may require extensive computing power and may not be possible to be performed in real time. Still, research is being conducted to address issues in solution of optimization problems in real-time.

An important example of a real-time, embedded optimization problem is model predictive control (MPC), where an optimal control problem over a receding horizon is solved during each sampling period. See L. Grune and J. Pannek, "Nonlinear model predictive control," in *Nonlinear Model Predictive Control*, pp. 43-66, Springer, 2011; J. B. Rawlings and D. Q. Mayne, *Model predictive control: Theory and design*. Nob Hill Pub., 2009; and G. C. Goodwin, M. M. Seron, and J. A. De Doná, *Constrained control and estimation: an optimisation approach*. Springer Science & Business Media, 2006, each incorporated herein by reference in their entirety. The optimal control problem for a discrete time linear-quadratic MPC formulation can be expressed as a convex quadratic program (QP). Furthermore, convex QPs form the basis for many algorithms used in nonlinear model predictive control (NMPC) such as sequential quadratic programming (SQP), or the real-time iteration scheme which solves just one QP per timestep. See P. T. Boggs and J. W. Tolle, "Sequential quadratic programming," *Acta numerica*, vol. 4, pp. 1-51, 1995; S. Gros, M. Zanon, R. Quirynen, A. Bemporad, and M. Diehl, "From linear to nonlinear mpc: bridging the gap via the real-time iteration," *International Journal of Control*, pp. 1-19, 2016; and M. Diehl, H. G. Bock, J. P. Schloder, R. Findeisen, Z. Nagy, and F. Allgöwer, "Real-time optimization and nonlinear model predictive control of processes governed by differential-algebraic equations," *Journal of Process Control*, vol. 12, no. 4, pp. 577-585, 2002, each incorporated herein by reference in their entirety.

Model Predictive Control (MPC) has been applied to vehicle subsystems such as engine control. For example, a rate-based MPC approach incorporates integral type action to guarantee zero steady state error by adding additional integral states to the predictive control model. An MPC model uses a number of different engine operating ranges (fuel rate and engine speed), and produces a controller for each range to control the engine actuators.

In a specific example of model predictive control applied to diesel engine airflow, the flows in the engine are controlled using the variable geometry turbine (VGT), EGR throttle, and an EGR valve actuator. These systems are strongly coupled and are highly non-linear.

However, existing methods for constrained optimal control in embedded automotive applications have been unable to perform required calculations within a required time period. In an example control system for a diesel engine, the Engine Control Unit (ECU) samples input signals, records measurements from sensors, performs calculations and issues commands. All of these operations must be performed within the input signal sampling period. In particular, the ECU is allocated a fixed percentage of the sampling period to complete all required calculations, referred to as a computational budget.

In recent years a significant amount of research into developing fast, reliable algorithms for solving both QPs and more general optimization problems online has significantly advanced the state of the art. However, managing the computational burden of online optimization algorithms remains a challenge.

It is desirable to provide a model predictive controller for controlling autonomous vehicle operations, particularly control of actuators within vehicle safety limits, in a period which is fast enough to accomplish all required calculations within the computational budget.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
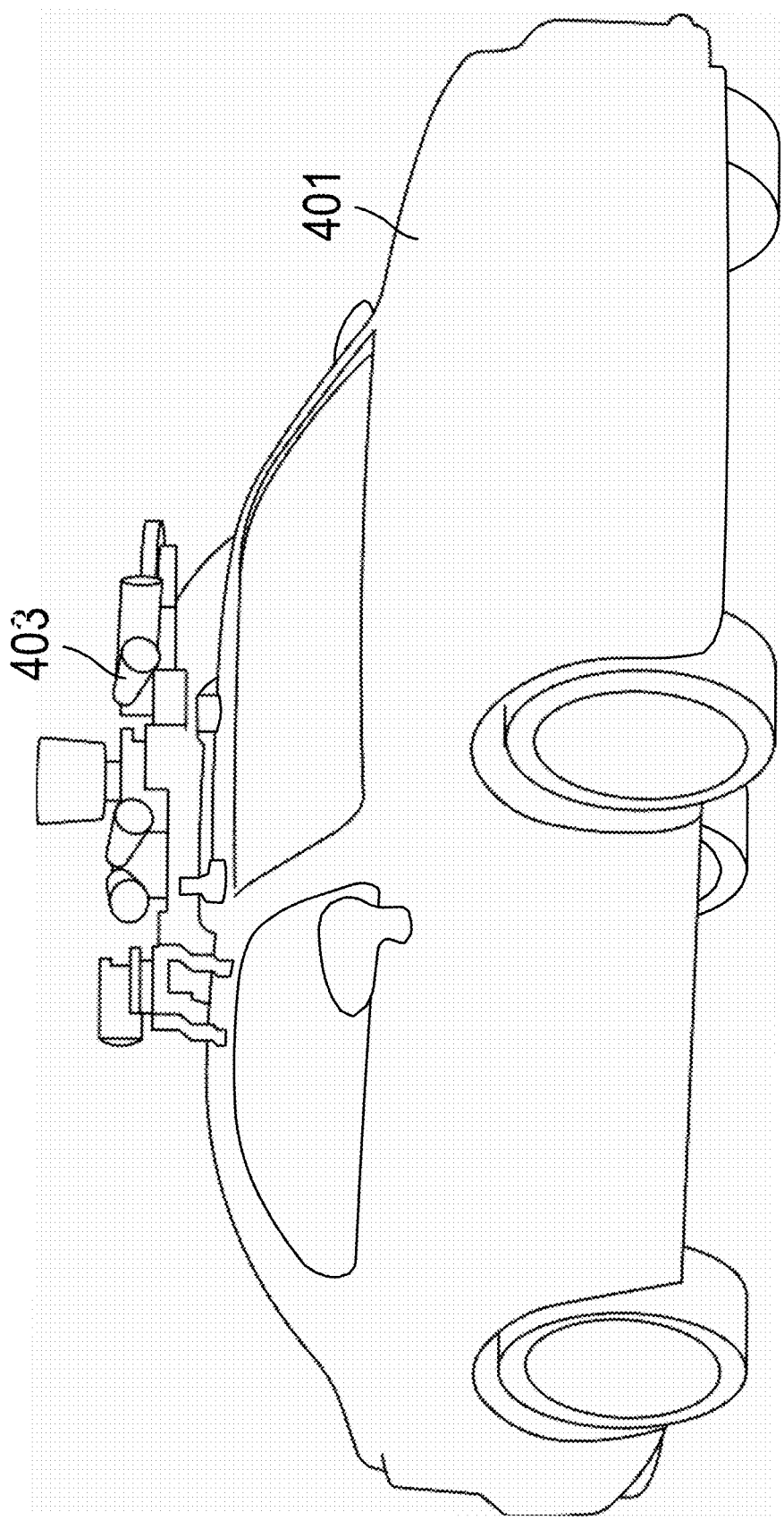
FIG. 1 is a schematic representation of an autonomous vehicle.

As used herein any reference to "one embodiment" or "some embodiments" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. In addition, the articles "a" and "an" as used in this application and the appended claims are to be construed to mean "one or more" or "at least one" unless specified otherwise.

Referring now to the drawings, wherein like reference numerals designate identical or corresponding parts throughout several views, the following description relates to techniques for constrained optimization applied to embedded model predictive control in an autonomous vehicle.

Autonomous vehicles may take the form of custom vehicles or modified conventional vehicles. Autonomous vehicles may include a combination of sensors, actuators, software implemented algorithms, and at least one processor to execute the software. The sensors and actuators may be used in subsystems for navigation and guidance, driving and safety, and performance. A subsystem for navigation and guidance is the Global Positioning System (GPS). The GPS computes present position based on signals received from satellites.

A subsystem for driving and safety typically includes an array of video cameras. Video cameras may capture images that may be used to detect where a lane is, detect objects, and detect lane markers. Another type of device for sensing objects is the LIDAR system. The LIDAR system provides accurate 3D information on the surrounding environment. Using this data, a processor implements object identification, motion vector determination, collision prediction, and avoidance strategies. The LIDAR unit provides a 360° view by using a rotating, scanning mirror assembly on the top of the car.

A subsystem for control of vehicle performance may include sensors and actuators related to power control. Power control may include measuring and managing power requirements. Control of vehicle performance may involve controls for an internal combustion engine.

The present disclosure utilizes vehicle dynamics, which takes into account the acceleration and steering of the vehicle, and the kinematics of a path, which takes into account the movement of a path frame over time in order to minimize the distance of the vehicle and a target path along a road. This distance may be due to discrepancies between movement of the vehicle and movement of the path frame. In the present disclosure, a path is defined by curvature, and may be represented by kinematic features including a position, velocity, and acceleration at a point. A trajectory is defined as a path of movement over time for a given velocity. Vehicle dynamics takes on the ordinary meaning of motion of the vehicle under action of forces.

In the present disclosure, vehicle safety is defined in terms of actuator range and rate and an obstacle collision envelope. Actuator range is defined in terms of a limit on the range of movement of the actuator. Actuator rate is defined in terms of a limit on the rate, or delay, that an actuator will react. Vehicle control is by way of commands issued by a control system to an actuator. An obstacle collision envelope is a range of distances to a potential obstacle.

Referring to FIG. 1, a vehicle 401, described hereafter by example as an autonomous vehicle, includes an array of sensors 403. Sensors may be mounted on a roof of a vehicle, may be included within the body of a vehicle, or a combination thereof. The types of sensors that may be mounted in an autonomous vehicle may include LIDAR, video cameras, radar antennas, sonar antenna. An autonomous vehicle may include internal sensors for monitoring various conditions of the vehicle, such as steering angle and vehicle speed.

Figure 2:
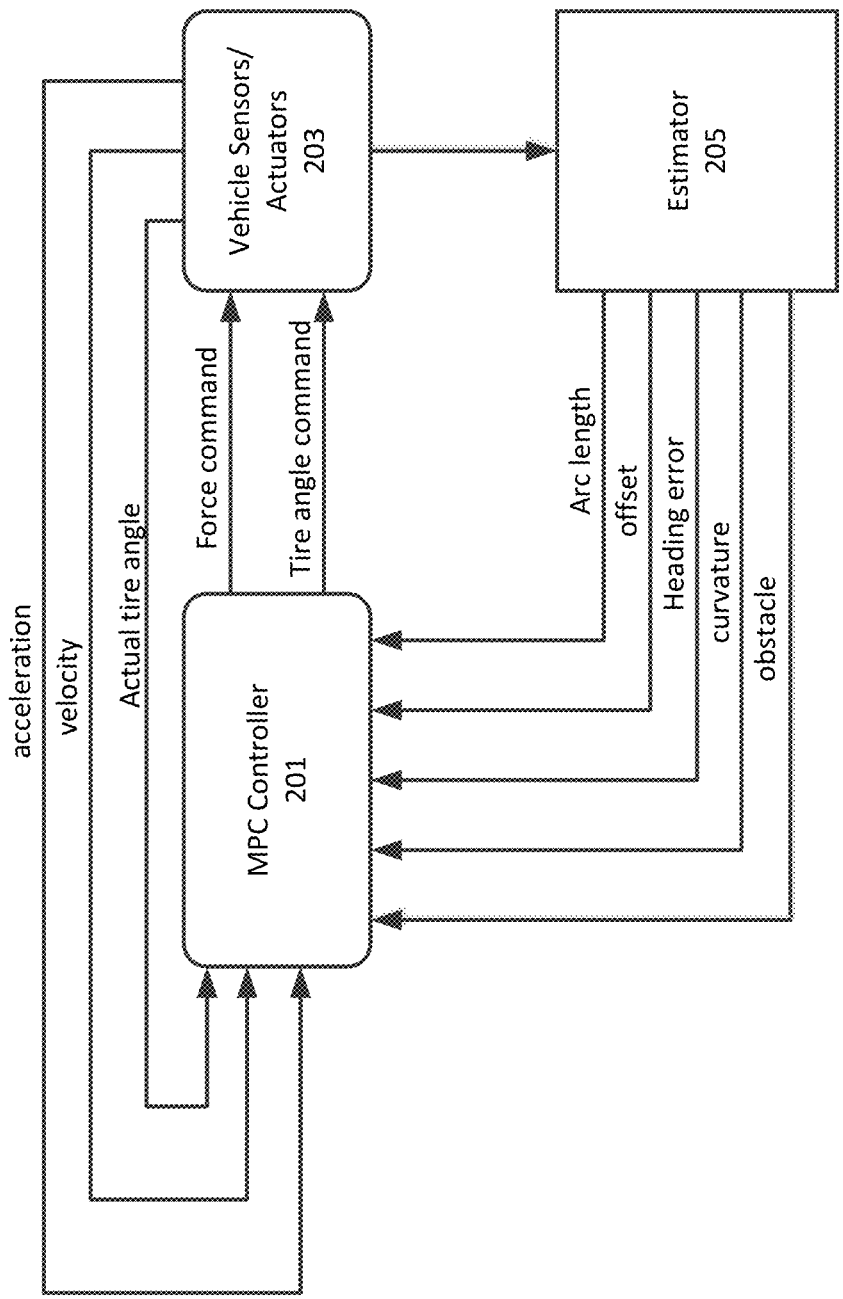
FIG. 2 is a control structure for the autonomous vehicle of FIG. 1.

Referring to FIG. 2, a control structure for an autonomous vehicle control system may include a vehicle Model Predictive Controller (MPC) 201, vehicle actuators 203, and an estimator 205. The MPC 201 receives as input information about the velocity, acceleration, and a steering angle (an angle of a tire) of the vehicle from vehicle sensors 203. The Estimator 205 may calculate parameters including an arc length of a target path, an offset between a center of a vehicle and the target path, a heading error, and the curvature of the target path. The Estimator 205 may also be able to detect an obstacle envelope. Provided the various signal inputs and estimated parameters, the MPC 201 may output a speed command and a steering command (a tire angle command) to vehicle actuators 203. Vehicle actuators associated with these actuators may include a steering actuator and an engine speed actuator.

The MPC 201 controls the vehicle actuators 203, for example a steering actuator and engine speed actuator. In doing so, the range of actuation of the actuators may be limited for purposes of safety. In one embodiment, the actuator limits are implemented as hard constraints, which are constraints that cannot be violated. The actuator limits may be characterized in terms of an actuator range (limited movement range) and an actuator rate (limited rate/delay that an actuator will react). In one embodiment, the tire angle command may be limited to a range of −30 to +30 degrees.

In addition, in the case of an autonomous vehicle, actuator limits may be defined with an objective of collision avoidance. An autonomous vehicle can be considered as being a fixed distance from obstacles at any given time. Subsequently, actuator limits such as steering angle and acceleration limits may be defined as the analytical maximum that will allow an operator to prevent a collision within human response time at a given speed. In one embodiment, actuator limits as a function of vehicle speed may be pre-stored as a lookup table.

Required distance from obstacles may be defined as an obstacle collision envelope. In one embodiment, detection by vehicle sensors that an obstacle, such as another vehicle, may come within a collision envelope may be implemented as a hard constraint that is avoided by the MPC 201.

Hard inequality constraints are difficult to calculate in a short enough amount of time that is within a human response time. An approach taken in this disclosure is to reformulate inequality constraints as equality constraints. As will be described more fully below, the reformulated equality constraints enable a fast solution using a Newton method.

The MPC 201 may also control the vehicle actuators 203 based on soft constraints. Soft constraints are constraints that can be violated analytically. Violations of soft constraints are treated as penalties in the control cost function, either as external penalties or as additional optimization parameters. Subsequently, the control cost function tends to move away from undesirable states. In one embodiment, soft constraints are applied to what may be referred to as comfort related actuations. Types of soft constraints may include jerk comfort, where jerk is the derivative of acceleration, acceleration comfort, which imposes a penalty on acceleration that is greater than a predetermined threshold, lateral acceleration, roll, which is an amount of rotation around a longitudinal axis, and traction/slip constraints, which involve loss of traction or slip due to, for example, wet road conditions.

Steering and acceleration of an autonomous vehicle may be controlled within a predetermined amount of time, using a system embedded in an Engine Control Unit (ECU), which typically is a small microcontroller. In particular, to be effective, the control operation performed by the MPC controller 201, and estimator 205 should be performed during each sampling period in which sensor readings are made.

In one embodiment, the ECU may sample about 100× per second. During a sampling period, the ECU records measurements from sensors, performs optimization calculations, and issues commands. Thus, the ECU preferably performs its required operations within a fixed percentage of the sampling period, referred to as a computational budget.

Generally, a control operation may be considered as being solution of an optimization problem subject to constraints. One way to express an optimal control problem for a discrete time linear-quadratic MPC formulation is as a convex quadratic program (QP).

An aspect of the present disclosure is a MPC, where the optimal control problem is solved during each sampling period.

An aspect of the present disclosure is a MPC which applies the Fischer-Burnmeister (FB) function and Newton's method to solving convex QPs, and hereinafter is referred to as Fischer Burmeister Regularized Smoothed (FBRS) approach. FBRS has some properties which make it attractive for embedded optimization. First, FBRS displays global linear convergence and quadratic asymptotic convergence to the solution; properties it inherits from its nature as a damped generalized Newton's method. Second, it is simple to implement. Finally, it can be effectively warmstarted when solving sequences of related QPs.

Figure 3:
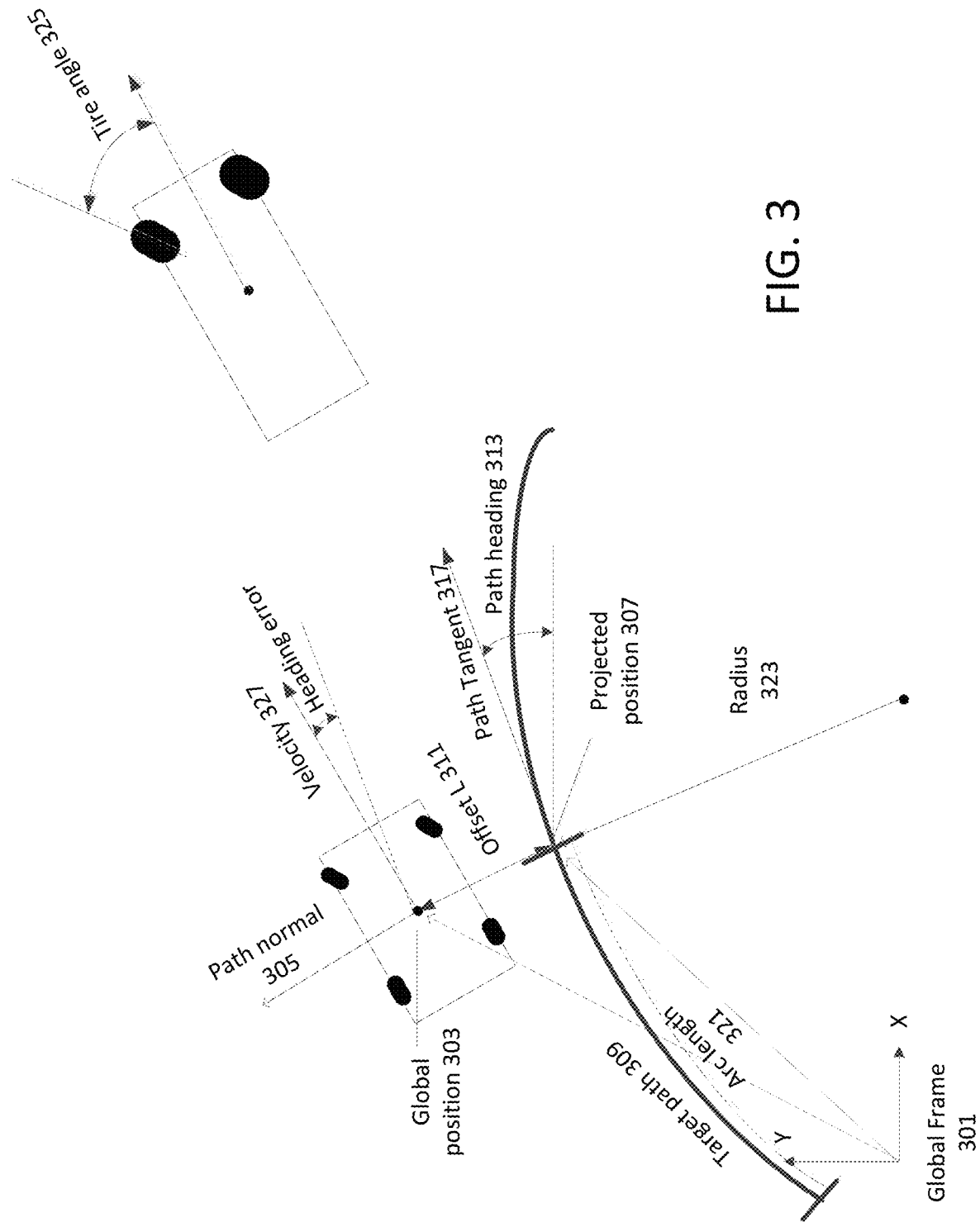
FIG. 3 illustrates a path tracking model in accordance with an exemplary aspect of the disclosure.

FIG. 3 illustrates elements of a path tracking model in accordance with an exemplary aspect of the disclosure. In the present disclosure, the MPC uses a model that is based on a dynamic path frame instead of a fixed global position. This model is used because MPC seeks to minimize the distance of the vehicle from a target path. To do so, the model monitors an offset L 311, as well as a derivative of the offset L. The offset L changes both if the vehicle moves (i.e., the path continues straight and the vehicle turns) or if the path moves (i.e., the path turns and the vehicle continues straight). Hence, the model uses a dynamic path frame.

As can be seen in FIG. 3, a Global Frame (X, Y) 301 represents a location of a stationary point, such as the location of a building or some other fixed structure. The center 303 of the vehicle is a point relative to the Global Frame 301. A line 305 normal to the vehicle and passing through the center 303 of the vehicle intersects with a point 307 on the target path 309. The point 307 at the intersection of the target path is a projected position. At that point 307, the target path 309 has a path heading 313. The projected position and path heading 313 defines a path frame (Xs, Ys). As the vehicle moves in a velocity direction 327, there may be a heading error 315 between the vehicle direction heading and a direction that is parallel to the target path tangent 317. A distance along the target path 309 to the projected position 307 is defined by an arc length 321. The curve at the projected position 307 has a radius 323. The MPC adjusts the vehicle steering (tire angle 325) in order to minimize the distance of the vehicle from the target path.

In the path tracking model, the MPC Controller 201 generates a Force Command $F^{cmd}$ and a tire angle command $\delta^{cmd}$ based on vehicle acceleration a, vehicle velocity V, and actual tire angle $\delta$, as well as estimated values derived from the estimator 205. Estimated values include arc length s, offset l, and heading error $\theta$. A dynamic path frame may be represented in terms of vehicle acceleration a, vehicle velocity V, arc length s, offset from target path l, heading error $\theta$ and tire angle $\delta$. The model may take into consideration actuator rate constraints for tire angle command $\delta^{cmd}$ and acceleration command $F^{cmd}$. Also, the model may be such that there is no lateral velocity and that force on vehicle and vehicle acceleration are in a longitudinal direction of the vehicle. However, a path tracking model may also take into consideration lateral velocity and lateral acceleration. An alternative representation of the dynamic path frame may be in terms of curvature k, change in curvature vs. arc length $\partial k/\partial s$, and reference velocity and acceleration.

Figure 4:
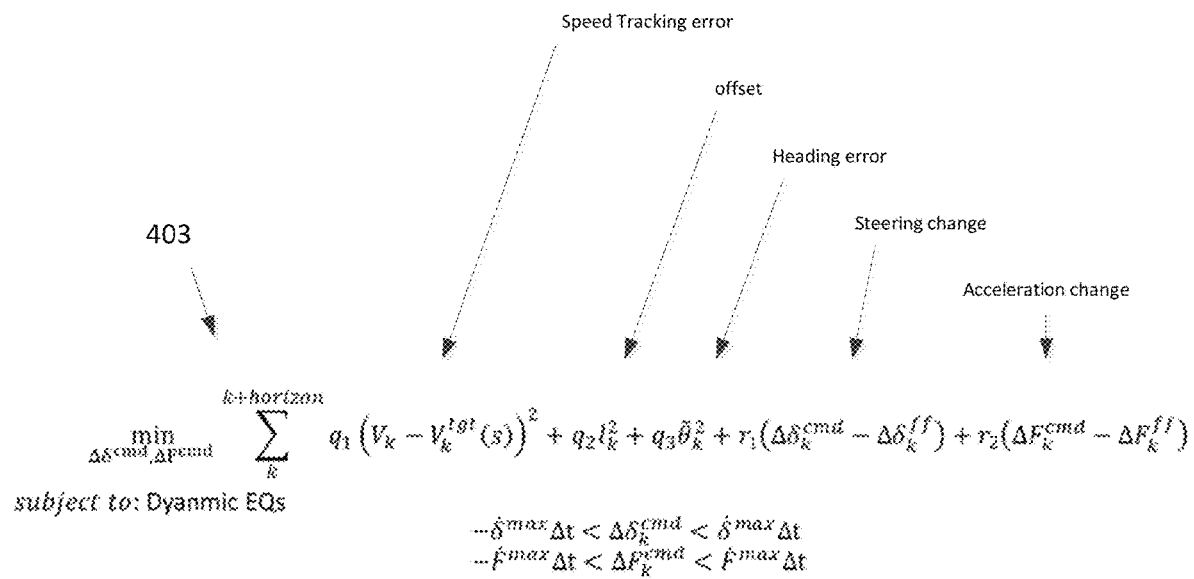
FIG. 4 shows a main function for the MPC optimization problem.

Regarding FIG. 4, the main function for the MPC optimization problem is shown. The MPC seeks to minimize 403 the steering rate $\Delta\delta^{cmd}$ and acceleration rate $\Delta F^{cmd}$ as a function of speed tracking error $(V_k - V_k^{tgt}(s))$, offset distance $(l_k)$, heading error $(\theta_k)$, steering rate $(\Delta\delta_k^{cmd} - \Delta\delta_k^{ff})$, and acceleration rate $(\Delta F_k^{cmd} - \Delta F_k^{ff})$ at a curvature k. Curvature k is typically defined as the inverse of the radius and is a function of the arc length s. The main function may be subject to hard constraints on the steering rate $\Delta\delta^{cmd}$ and acceleration rate $\Delta F^{cmd}$. In one embodiment, slip may be taken into account by imposing a penalty for deviation from path heading—(heading+slip angle).

Figure 5:
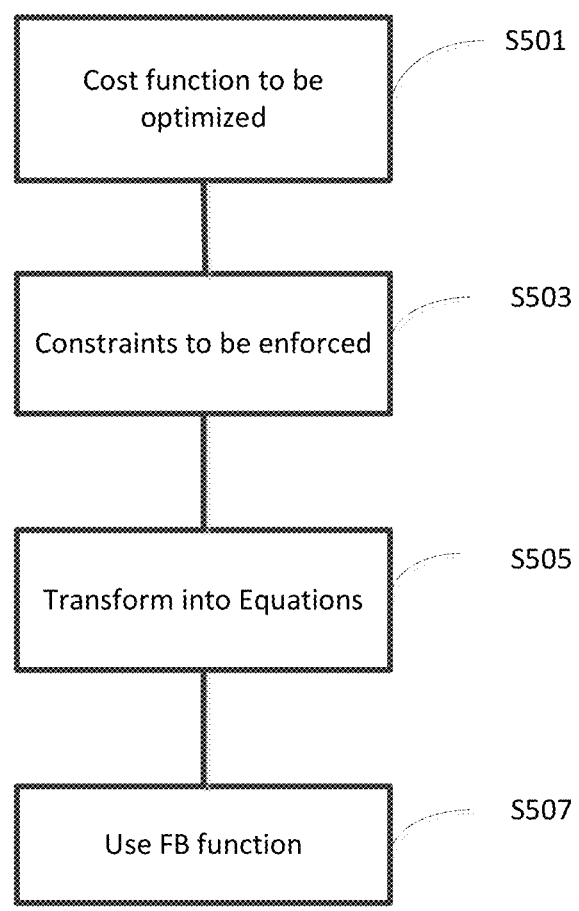
FIG. 5 shows a flowchart for a method of obtaining equations related to the MPC optimization problem.

Regarding FIG. 5, in order to solve the MPC optimization problem, in S501 the main function in FIG. 4 is set as the cost function to be optimized. In S503, the constraints are set as constraints to be enforced. In S505, the cost function and constraints are transformed using linear approximation to obtain a quadratic program (QP), which in S507 is to be solved using FBRS. An example QP in S505 is of the form $$\min(z)z^THz+f^Tz, \text{ subject to } Az \leq b,$$

where $H \in S^n$ is the Hessian matrix, $f \in \mathbb{R}^n$, $z \in \mathbb{R}^n$, $A \in \mathbb{R}^{q \times n}$, $v \in \mathbb{R}^q$. For simplicity the QP may be for the case where there are no equality constraints; one of ordinary skill would understand that the extension to equality and inequality constrained problems is straightforward. For this example, the Karush-Kuhn-Tucker (KKT) conditions for the QP are:

$$Hz+f+A^Tv=0$$

$$v^Ty=0$$

$$v \geq 0, y \geq 0$$

The variable z represents control actions, particularly those that minimize the cost function. The variable v represents sensitivities, which are internal variables calculated in the system that quantify how sensitive the cost function is to the constraints. The variable y=b−Az represents constraint margin. If y is positive, the constraints are satisfied. If y is negative, the constraints are not satisfied.

In order to solve the conditions for optimality using the FB function, S507, the conditions are rewritten as a function F(x) using the FB transform. For example, the complementarity conditions $v \geq 0$, $y \geq 0$, $y^Tv=0$ are replaced with FB equations $\phi(y, v)$, where x=(z, v) and y=b−Az. Applying the FB function to the complementarity conditions in yields the following nonlinear mapping, $$F_\varepsilon(x) = \begin{bmatrix} Hz + f + A^Tv \\ \phi_\varepsilon(v, y) \end{bmatrix}.$$

Because of the properties of FB functions, the function F(x) has the property that F(x)=0 if and only if x satisfies the KKT conditions.

The FBRS algorithm functions by approximate solving a sequence of problems $F_{\varepsilon_j}(x_1)=0$ using Newton's method for a decreasing sequence $\varepsilon_j \to 0$ and is in this way similar to other homotopy methods, such as the interior point method (IPM). However, unlike an interior point method, the subproblems do not become ill-conditioned or difficult to solve as $\varepsilon_j \to 0$, in fact $\varepsilon_j$ can be set to exactly zero after a finite number of homotopy steps.

The mapping F(x) is single-valued but is not continuously differentiable; however, F(x) is semismooth so a semismooth Newton's method can be applied to the root-finding problem F(x)=0. If F is smoothed ($\varepsilon$>0) then $F_\varepsilon(x)$ is continuously differentiable so (regular) Newton's method is applicable.

Figure 6:
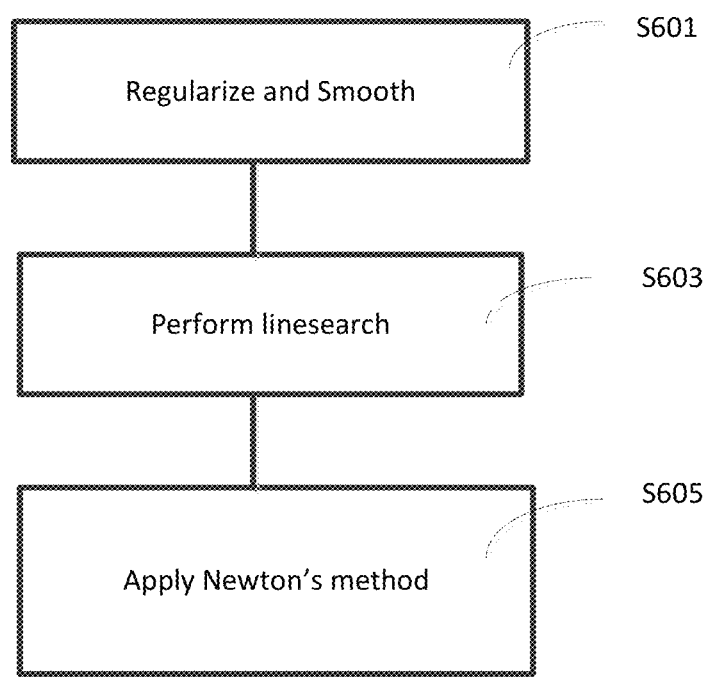
FIG. 6 shows a flowchart for the Regularized Smoothed Fischer-Burmeister method.

Regarding FIG. 6, to solve F(x)=0, at a semismooth Newton's method is applied, which yields an iteration $$x_{k+1}=x_k-t_kV_k^{-1}F\varepsilon_k(x_k),$$

where $V_k \in \partial_C F_{\varepsilon_k}(x_k)$ and $t_k \in (0,1]$ is a step-length chosen by, at S603, a linesearch to enforce convergence in a case of being far from a solution. The iteration matrix or Jacobian $V_k$ is always non-singular for any $\varepsilon$>0 but may become ill-conditioned if $\varepsilon$ is small. To remedy the situation, at S601, a proximal regularization term is added to help control numerical conditioning; the regularized and smoothed equations are defined as $$F_{\varepsilon,\delta} = F_\varepsilon(x) + R(x, x_k, \delta) = \begin{bmatrix} Hz + f + A^Tv \\ \phi(v, y) + \delta(v - v_k + y - y_k) \end{bmatrix},$$

where $\delta$>0 controls the regularization. The modified Newton iteration, S605, is then $$x_{k+1}=x_k-t_kK_k^{-1}F_{\varepsilon_k}(x_k),$$

where $K_k=V_k+\nabla_x R(x_k,\delta)$ is used in place of $V_k$.

The algorithm for FBRS is summarized in Algorithm 1, below, and represents a semismooth Newton's method globalized using a linesearch and homotopy. The merit function used to globalize each step of the algorithm is defined as $$\theta(x) \varepsilon \tfrac{1}{2} \|F_\varepsilon(x)\|_2^2,$$

the parameter $\sigma \in (0,0.5)$ encodes how much reduction is required in the merit function. The desired tolerance is denoted $\tau$, and, $\beta \in (0,1)$ controls reduction in the backtracking linesearch. More sophisticated algorithms for computing $t_k$, e.g., polynomial interpolation can be used in place of the backtracking linesearch; however this simple algorithm is effective in practice. See C. T. Kelley, *Iterative methods for optimization*. SIAM, 1999, incorporated herein by reference in its entirety. Typical values for the fixed parameters are $\varepsilon \approx 10^{-4}$ and $\beta \approx 0.7$.

---

Algorithm 1 FBRS

---

Input: H, A, f, b, $x_0$, $\sigma$, $\beta$, $\tau$, $\delta$, max_iters
Output: x
1: x ← $x_0$
2: $\varepsilon$ ← $\varepsilon_0$
3: $\delta$ ← $\delta_0$
4: for k = 0 to max_iters−1 do
5:    $\delta$ ← min($\delta$,||$F_\varepsilon$(x)||)
6:    $\varepsilon$ ← $\varepsilon_k$
7:    if ||F (x)|| ≤ $\tau$ then
8:      break;
9:    end if
10:   Solve K(x,$\varepsilon$,$\delta$)$\Delta$x = −$F_\varepsilon$(x,$\varepsilon$)
11:   t ← 1
12:   while $\theta_\varepsilon$(x + t$\Delta$x) ≥ t(1 − 2$\sigma$)$\theta_\varepsilon$(x) do
13:      t ← $\beta$t
14:   end while
15:   x ← x + t$\Delta$x
16: end for
17: return x

---

Figure 7:
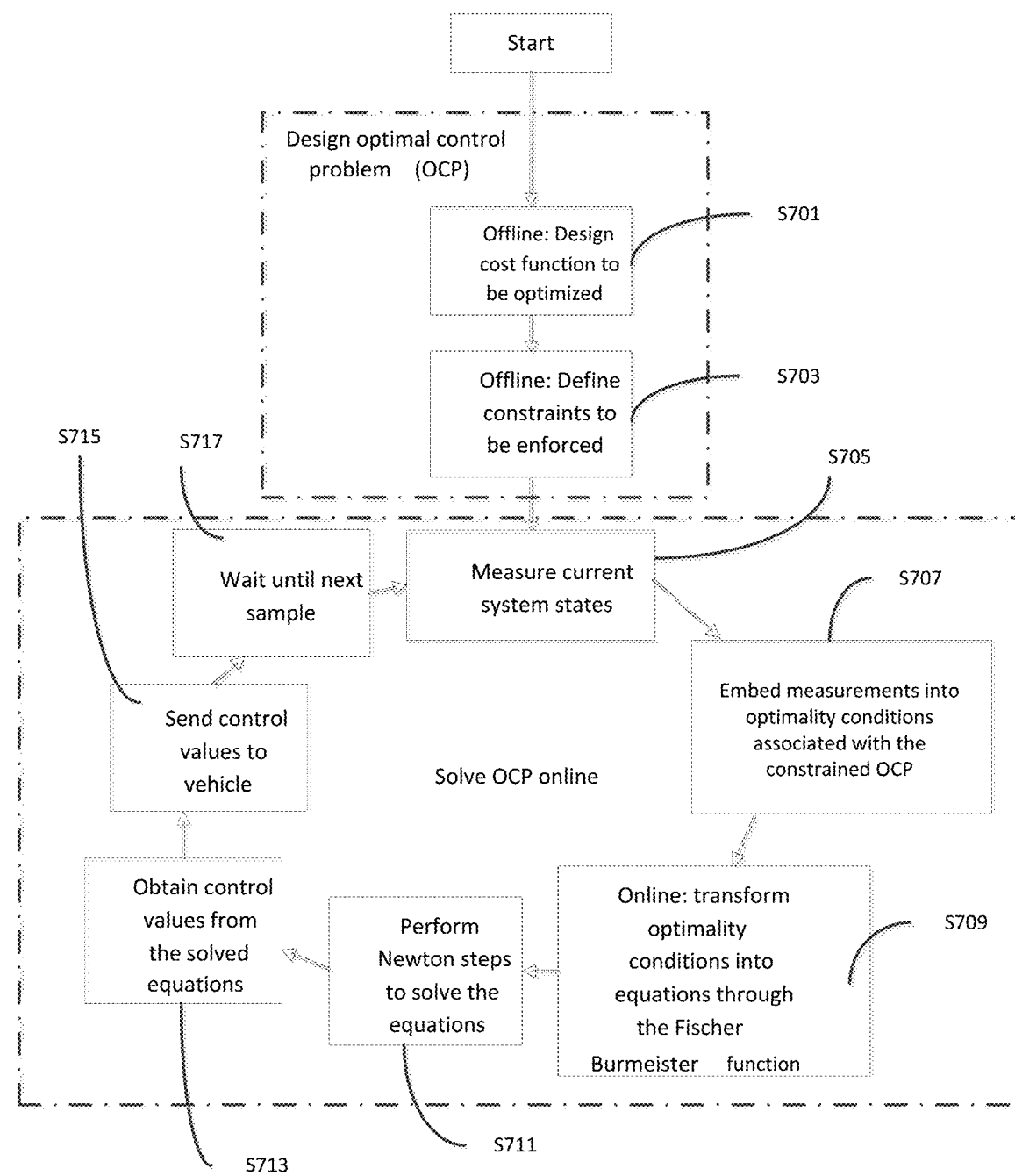
FIG. 7 shows a flowchart for real-time control of an autonomous vehicle.

A system which includes the features in the foregoing description provides numerous advantages. In particular, the MPC described herein can optimize minimize the distance of the vehicle from a target path in real-time, at each sensor sampling period. FIG. 7 shows a flowchart for the iterative solution of a vehicle optimal control in real time. Regarding S701 and S703, the cost function and constraints to be enforced, such as in FIG. 4 may be defined offline, before a vehicle is shipped. In S705, sensor readings are sampled and estimators are calculated in order to measure current vehicle actuator states. In S707, the measured system states are embedded into conditions for optimality associated with the constrained optimal control problem. In S709, the optimality conditions are transformed into equations through Fischer-Burmeister function transformation. In S711, iterations are performed using the modified Newton's method to obtain control values in S713. In one embodiment, the modified Newton's method is performed for one iteration over a sampling period. It has been determined that the cost function produces a sufficient solution well within the required time period of a sampling period. In S715, control values are transmitted to control the vehicle. The remaining time is spent waiting, in S717, until the beginning of the next cycle. Vehicle optimal control may be performed online using the embedded real-time control problem solver at each sensor sampling period.

Figure 8:
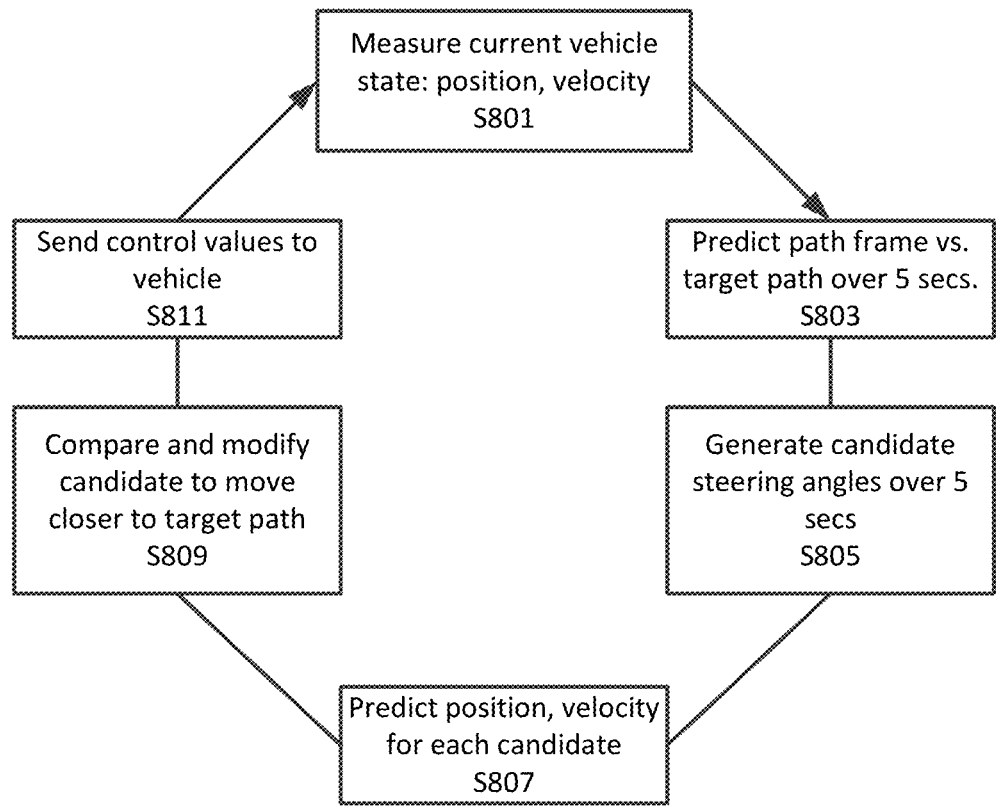
FIG. 8 shows a flowchart for an example of steering control in accordance with an exemplary aspect of the disclosure.

FIG. 8 shows a flowchart for an example of steering control in accordance with an exemplary aspect of the disclosure. Steering control is accomplished by determining current steering state from the vehicle sensors (tire angle), and for a predefined prediction horizon, which is represented as a number of points in the future (e.g., 120 points), the steering angle is predicted for these future points for a period of time into the future.

In particular, in S801, a current state of the vehicle is detected (measured position, velocity, tire angle, offset, heading). In S803, a path frame is predicted based on a target path over a period of up to 5 seconds. In S805, a set of candidate control actions, for example steering in 1 sec, 2 sec, 3 sec, . . . 5 sec (good solutions that satisfy hard constraints) are determined. In S807, a prediction for each candidate is made. In S809, a comparison is made between the prediction vs the desired (target) to obtain errors and optimization is performed to obtain control actions that will move predicted solution closer to the target. In S811, control commands are issued to the steering actuator.

Figure 9:
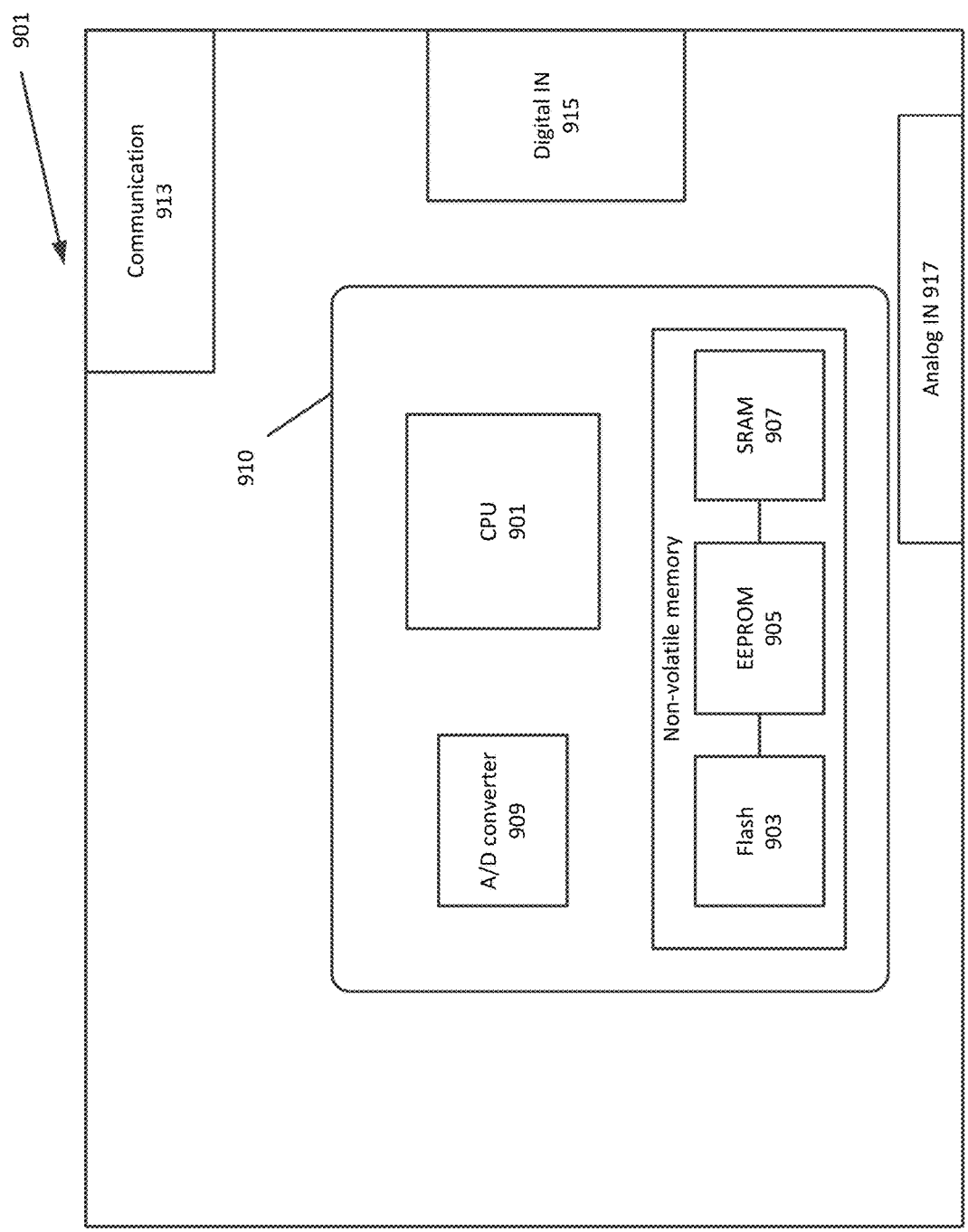
FIG. 9 shows a block diagram for an exemplary controller.

The computer-based control system 201 may be based on a microcontroller. A microcontroller may contain one or more processor cores (CPUs) along with memory (volatile and non-volatile) and programmable input/output peripherals. Program memory in the form of flash, ROM, EPROM, or EEPROM is often included on chip, as well as a secondary RAM for data storage. In one embodiment, regarding FIG. 9 the computer-based system 201 is an integrated circuit board 901 with a microcontroller 910. The board may include digital I/O 915, analog inputs 917, and hardware serial ports 913.

In one embodiment, the microcontroller is a 8-bit RISC-based microcontroller having a flash memory 903, SRAM 907, EEPROM 905, general purpose I/O lines, 32 general purpose registers, a real time counter, six flexible timer/counters, and an A/D converter 909. The microcontroller may be a single SOC. It should be understood that various types of microcontrollers may be used. Microcontrollers vary based on the number of processing cores, size of non-volatile memory, the size of data memory, as well as whether or not they include an A/D converter or D/A converter.

Numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. A system for controlling an autonomous vehicle, the system comprising:
a controller configured to:
in each sampling period minimize a distance of the autonomous vehicle from a target path by solving a constrained control problem,
input sensor values and estimators that are calculated based on the sensor values and dynamic models and record the sensor values and the estimators in a memory of the controller,
incorporate the sensor values and the estimators into conditions for minimizing the distance of the autonomous vehicle from the target path associated with the constrained control problem,
map the conditions for minimizing the distance of the autonomous vehicle from the target path to a non-smooth system using Fischer-Burmeister function,
smooth the non-smooth system and apply Newton method iterations to the smoothed system in order to converge on a solution, and
issue commands including a steering command that control actuators of the autonomous vehicle based on the solution.

2. The system of claim 1, wherein the conditions for minimizing associated with the constrained control problem includes a cost function and hard constraints to be enforced.

3. The system of claim 2, wherein the hard constraints are constraints on the actuators, including one or more of a maximum range of steering adjustment and a maximum vehicle acceleration.

4. The system of claim 2, further comprising an obstacle sensor,
wherein the sensor values include information of an obstacle, and
wherein the hard constraints are used to determine a motion constriction envelope determined based on the obstacle information.

5. The system of claim 2, wherein the cost function includes soft constraints.

6. The system of claim 5, wherein the soft constraints are constraints on comfort related actuations of the autonomous vehicle.

7. The system of claim 1, further comprising a tire angle sensor and vehicle velocity sensor,
wherein the sensor values include one or more of tire angle obtained from the tire angle sensor and vehicle velocity obtained from the vehicle velocity sensor.

8. A method for controlling an autonomous vehicle having a controller, the system comprising:
in each sampling period, the controller
minimizing a distance of the autonomous vehicle from a target path by solving a constrained control problem,
inputting sensor values and estimators that are calculated based on the sensor values and dynamic models and record the sensor values and the estimators in a memory of the controller,
incorporating the sensor values and the estimators into conditions for minimizing the distance of the autonomous vehicle from the target path associated with constrained control problem,
mapping the conditions for minimizing the distance of the autonomous vehicle from the target path to a non-smooth system using Fischer-Burmeister function,
smoothing the non-smooth system and performing Newton method iterations on the smoothed systems in order to converge on a solution, and
issuing commands including a steering command that control actuators of the autonomous vehicle based on the solution.

9. The method of claim 8, wherein the conditions for minimizing associated with the constrained control problem includes a cost function and hard constraints to be enforced.

10. The method of claim 9, wherein the hard constraints are constraints on the actuators and include one or more of a maximum range of steering adjustment and a maximum vehicle acceleration.

11. The method of claim 9,
wherein the inputting sensor values includes obtaining information of an obstacle from an obstacle sensor, the method further comprising
determining a motion constriction envelope based on the obstacle information as the hard constraints.

12. The method of claim 9, wherein the conditions for minimizing associated with the cost function includes soft constraints.

13. The method of claim 12, wherein the soft constraints are constraints on comfort related actuations of the autonomous vehicle.

14. The method of claim 8, wherein the inputting sensor values includes obtaining tire angle from a tire angle sensor and vehicle velocity from a vehicle velocity sensor.

15. A controller for controlling an autonomous vehicle, a controller configured to:
in each sampling period minimize a distance of the autonomous vehicle from a target path by solving a constrained control problem,
input sensor values and estimators that are calculated based on the sensor values and dynamic models and record the sensor values and the estimators in a memory of the controller,
incorporate the sensor values and the estimators into conditions for minimizing the distance of the autonomous vehicle from the target path associated with the constrained control problem,
map the conditions for minimizing the distance of the autonomous vehicle from the target path to a non-smooth system using Fischer-Burmeister function,
smooth the non-smooth system and apply Newton method iterations to the smoothed system in order to converge on a solution, and
issue commands including a steering command that control actuators of the autonomous vehicle based on the solution.

16. The controller of claim 15, wherein the constrained control problem includes a cost function and hard constraints to be enforced.

17. The controller of claim 16, wherein the hard constraints are constraints on the actuators and include one or more of a maximum range of steering adjustment and a maximum vehicle acceleration.

* * * * *